June 12, 1956  W. O. KUHN  2,749,778
ARTICULATED PLANETARY GEARING
Filed March 11, 1952  2 Sheets-Sheet 1

INVENTOR.
Walter Otto Kuhn
BY
Fraser, Myers & Manley
ATTORNEYS

June 12, 1956 — W. O. KUHN — 2,749,778
ARTICULATED PLANETARY GEARING
Filed March 11, 1952
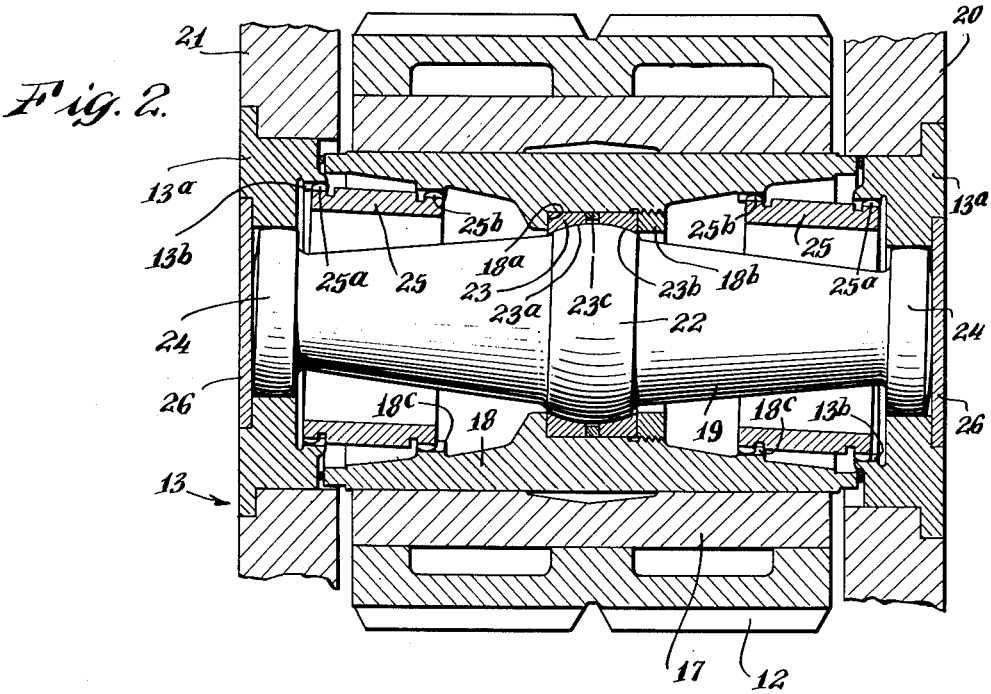
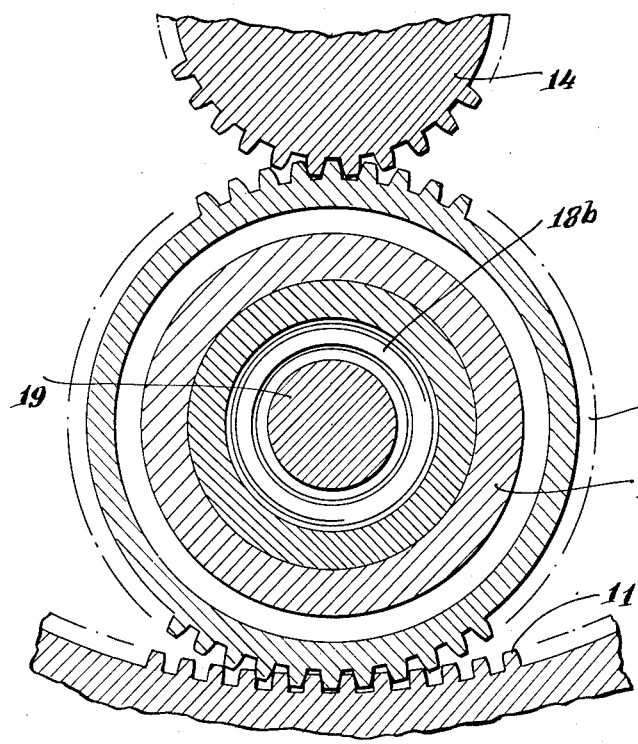
INVENTOR.
Walter Otto Kuhn
BY
Fraser, Myers Manley
ATTORNEYS.

United States Patent Office 2,749,778
Patented June 12, 1956

2,749,778

ARTICULATED PLANETARY GEARING

Walter Otto Kuhn, Clarence, N. Y., assignor to Farrel-Birmingham Company, Inc., Buffalo, N. Y., a corporation of Connecticut Application March 11, 1952, Serial No. 275,869

6 Claims. (Cl. 74—801)

The present invention relates to articulated planetary gearing and aims to provide certain improvements therein.

In the field of mechanical power transmission the demand for compact, lightweight reduction gearing is ever-increasing, especially in the fields of marine application and aviation.

In a planetary gear system composed of a sun pinion, a multiple of planets and an internal ring gear wherein the planets mesh with the sun pinion and the internal ring gear and travel in a path concentric with the axis of the sun pinion, it becomes necessary to provide means to distribute the load among the planets and, in addition, provide means for distributing the load across the face of the teeth. As the size of the unit, both in physical dimensions and power transmitted increases, the necessity for providing means for distributing the load becomes more and more important. Theoretically, of course, if the gear elements and spacing of the planet pinions are absolutely accurate, then each pinion can be expected to take its proper load. However, it is a practical impossibility to produce gears of such accuracies, and also to space a multiplicity of pinions accurately enough so that they will make perfect contact with the engaging sun gear and fixed gear.

Accordingly, an object of the present invention is to equalize the load which is transmitted from the sun or central gear of a planetary gear system, through the planet gears to the internal gear or to the cage carrying said planet gears so that an equal amount of torque will be transmitted through each planet gear.

A further object is to provide a novel resilient mounting for the individual planet gears whereby to permit each planet pinion to take an equal share of the load.

The foregoing and other objects and advantages of the invention not specifically recited will become apparent to those skilled in the art from the following detailed description, when considered in connection with the accompanying drawings, wherein:

Fig. 2 is a radial section through a planetary pinion mounting showing in an exaggerated manner the position of a supporting shaft under carrier deflection in a tangential plane.

Fig. 3 shows a sectional view taken along the line 3—3 of Fig. 1.

Figure 1:
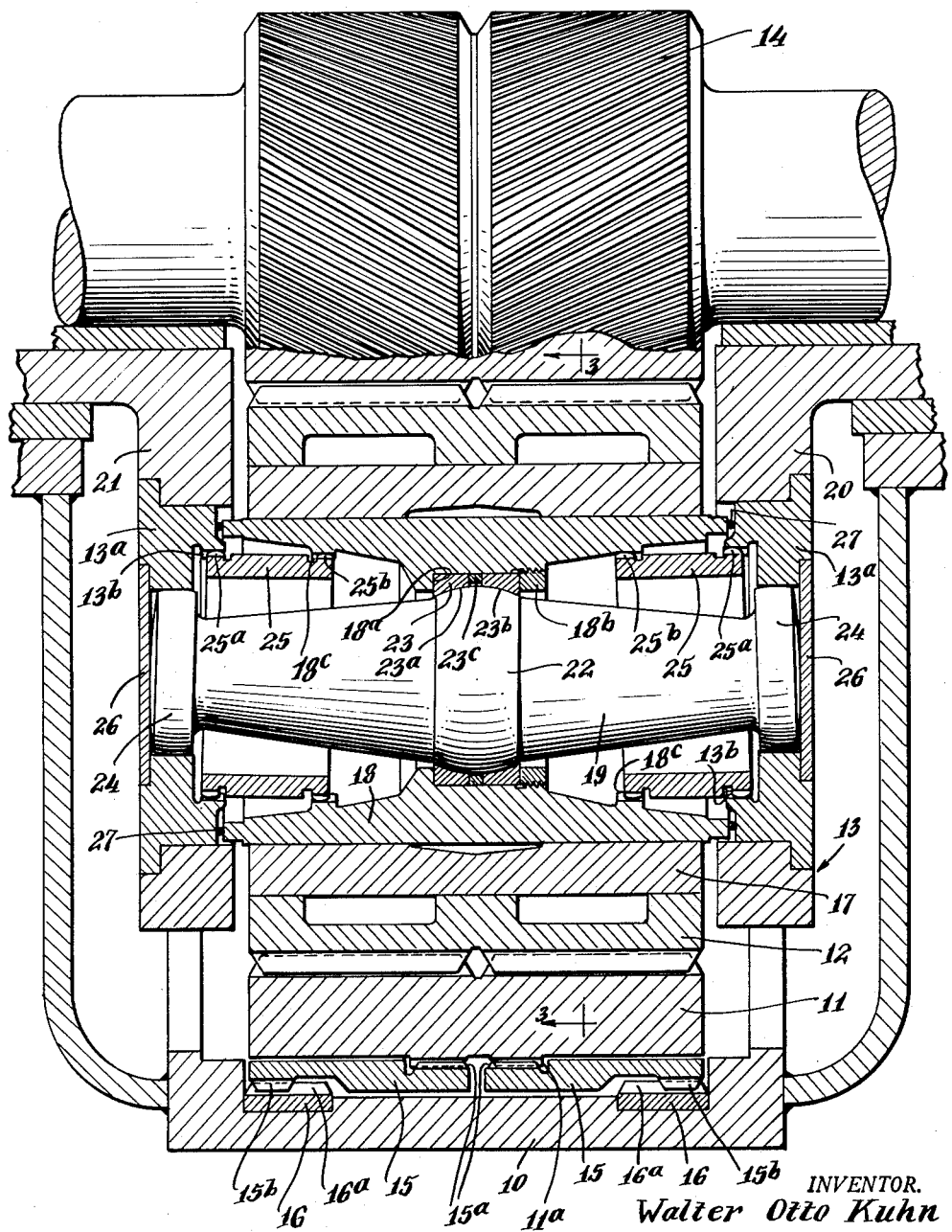
Figure 1 is a radial section through a portion of a planetary gear unit embodying my invention, showing in an exaggerated manner the tangential deflection of a planet gear shaft in a plane perpendicular to the plane of the paper, i. e., the tangential plane.

Referring to the drawings, the planetary gearing system comprises a housing 10 within which is mounted an internal ring gear 11, the teeth of which are in mesh with a plurality of planet pinions 12 carried by a cage 13, the planet pinions being also in mesh with a central sun gear 14.

The internal ring gear 11, as herein shown, is floatingly mounted within the housing 10 on articulating sleeves 15 symmetrically disposed on each side of the medial plane of the ring gear 11, said sleeves 15 having internal spur gear teeth 15a and external spur gear teeth 15b in mesh, respectively, with external gear teeth 11a on the ring gear and internal gear teeth 16a on a pair of anchor rings 16 fixedly mounted in the housing.

The planet pinions 12, which are equal-angularly spaced about the cage, are each formed with a bearing 17 which is mounted on a journal 18 through which extends a shaft 19, the ends of which are supported in end plates 13a mounted in the forward and aft walls 20 and 21, respectively, of the cage 13. As herein shown, the internal ring gear 11, planet pinions 12 and ring gear 14 are of the herringbone type but it will be obvious that said gears may be of any other type.

Each shaft 19 is disposed coaxially with its journal 18 and has an enlarged, medial portion 22 of spherical or arcuate form in peripheral, radial cross-section mounted within a complemental spherical or arcuate bearing seat 23 within the journal whereby the pinion and journal are rockably supported. The bearing seat 23 may be of any desired form and is herein shown as consisting of a pair of bearing seats 23a and 23b which are held spaced apart by a spacer ring 23c, the said parts being held against a shoulder 18a on the journal by a nut 18b. The ends of each shaft 19 are formed with radial flanges 24, the peripheries of which are also arcuate in radial cross-section to provide a rockable mounting for each shaft within the end plates 13a. The spherical portions at the medial and at the ends of the shafts allow the planet and its journal to tilt relative to the axis of the shaft. Each shaft 19 is of progressively smaller diameter from the enlarged medial portion 22 to the portions adjacent the flanged ends and has a carefully calculated deflection characteristic so as to allow the planet to drift tangentially backward as the load upon the planets is increased. By making the shafts 19 substantially identical and introducing the same construction into each of the multiple planets in a given gear unit, a method for distributing the load among the various planets is brought about. This compensates for errors in tooth spacing and assures, providing the deflection allowance is satisfactory, a more equitable distribution of carrying capacity by each of the planets. The tangential deflection allowance is illustrated in an exaggerated manner in Fig. 1. The total deflection allowed by such means, generally speaking, will be of the magnitude of .015" to .030".

In most large planetary gear units the carrier which transfers the output forces from the planet to the output shaft twists under full load. This means that the forward wall of the carrier advances relatively to the aft wall of the carrier. The means provided by the spherical seats allows the planet to assume a position with respect to the sun pinion and the ring gear so as to most equitably distribute the tooth force along the face of the teeth—in other words—along the axis of the planet.

For holding each journal 18 from rotating under frictional force developed at the bearing surfaces between said journal and the planet pinion, there are provided locking sleeves 25, here termed "articulating sleeves," which are formed at each end with external spur type gear teeth 25a and 25b which mesh with internal gear teeth 13b and 18b on the end plates 13a and the journal 18, respectively.

Since oil supplied through ducts (not shown) to the journal 18 is directed up through the aft wall 21 of the planet cage and through the end plate 13a in said aft wall to the interior of the journal 18, it is essential that the oil grooves normally located in the journal be held in fixed relationship to the planet cage. Drilled holes (not shown) pass through from the chamber or inside of the journal to the oil grooves, allowing passage of oil to feed the bearing surfaces. In other words, all parts of the shaft 19, the articulating sleeves 25 and the bearing seat 23 are continually submerged in oil and that the oil reaches the bearing surface oil groove at the proper point. The articulating sleeves 25, therefore, resist the torsion due to the frictional force, but allow the misalignment, as shown in an exaggerated manner, in Fig. 2, in order to compensate for planet cage deflection. To confine the oil within the journal and bearings, closure plates 26 cover the shaft flange bearings and O-packing rings 27 are disposed between the ends of the journal and the inner face of the end plates 13a.

Under the above-described arrangement, with allowances for planet cage twist and tangential deflection, a planetary unit, if supplied with a full floating ring gear such as 11, can compensate for a small amount of sun pinion torsional wind-up.

While I have shown and described a preferred embodiment of my invention, it is to be understood that changes may be made therein within the range of mechanical and engineering skill, without departing from the spirit of the invention as hereinafter defined.

What I claim is:

1. An articulated planetary gearing system comprising a sun gear, a planet cage carrying a plurality of pinions in meshing engagement with said sun gear, an independent elastic shaft supporting each of said pinions on said cage, a journal between each shaft and pinion and articulating sleeves for holding the journal against rotating relative to the planet cage under frictional load developed at the bearing surfaces between the journal and the pinion mounted thereon.

2. An articulated planetary gearing system according to claim 1, wherein the planet cage and the journal have gear teeth and the articulated sleeves have gear teeth in mesh with the gear teeth on the cages and on the journal.

3. A large size articulated planetary gear unit comprising a sun gear, a plurality of planet pinions in meshing engagement with the sun gear, a planet cage consisting of a pair of independently mounted walls supporting the planet pinions and capable of slight rotary movement relative to each other under torque loading, elastic deformable shafts each supporting a pinion on the cage walls, the ends of each of said shafts being of larger diameter than the shaft portions adjacent said ends, and the peripheries of said enlarged ends being arcuate in radial cross-section, whereby the shafts are rockably mounted in said walls.

4. An articulated planetary gear unit according to claim 3, wherein a journal is rockably mounted on each shaft and supports a planetary pinion.

5. An articulated planetary gear unit according to claim 4, wherein the peripheral medial portion of each shaft is of larger diameter than the portions adjacent its enlarged ends and said medial portion is arcuate in radial cross-section, and each of said journals has a medial bearing seat complemental in shape to the medial portion of the shaft upon which said journal is mounted.

6. An articulated planetary gear unit according to claim 5, wherein each shaft has a progressively smaller diameter from its medial portion to the portions adjacent its enlarged ends.

References Cited in the file of this patent

UNITED STATES PATENTS

| 1,928,763 | Rosenberg | Oct. 3, 1923 |
| 2,144,937 | Ryder | Jan. 24, 1939 |
| 2,460,629 | Fawick | Feb. 1, 1949 |
| 2,547,877 | Lucia | Apr. 3, 1951 |
| 2,591,734 | Smith et al. | Apr. 8, 1952 |
| 2,591,743 | Thompson | Apr. 8, 1952 |

FOREIGN PATENTS

| 239,068 | Great Britain | Sept. 3, 1925 |
| 606,634 | Germany | Dec. 6, 1934 |
| 612,883 | Great Britain | Nov. 18, 1948 |
| 814,981 | Germany | Sept. 27, 1951 |